United States Patent

Nagata et al.

[11] Patent Number: 5,777,413
[45] Date of Patent: *Jul. 7, 1998

[54] BEARING INSTALLATION IN A FLOPPY DISK DRIVER MOTOR

[75] Inventors: Toshihiko Nagata, Ogasa-gun; Hiroshi Sano, Iwata-gun; Takayuki Yamawaki, Kakegawa; Kunitake Matsushita, Toyohashi, all of Japan

[73] Assignee: Minebea Co., Ltd., Kitasaku-gun, Japan

[*] Notice: The term of this patent shall not extend beyond the expiration date of Pat. No. 5,486,054.

[21] Appl. No.: 580,255

[22] Filed: Dec. 28, 1995

[30] Foreign Application Priority Data

Dec. 29, 1994 [JP] Japan ................... 6-339116

[51] Int. Cl.$^6$ ........................................ F16C 19/10
[52] U.S. Cl. ................. 310/90; 310/40 MM; 310/67 R; 310/83; 310/156
[58] Field of Search ........................ 310/67 R, 90, 310/83, 156

[56] References Cited

U.S. PATENT DOCUMENTS

| | | | |
|---|---|---|---|
| 1,363,087 | 12/1920 | Clayton | 310/90 |
| 2,157,752 | 5/1939 | Fieistadter | 172/36 |
| 3,463,951 | 8/1969 | Bauerle et al. | 310/51 |
| 3,500,087 | 3/1970 | Wendt | 310/90 |
| 4,005,493 | 1/1977 | Morgan | 360/106 |
| 4,792,245 | 12/1988 | Fuke et al. | 384/610 |
| 4,885,948 | 12/1989 | Thrasher, Jr. et al. | 310/83 |
| 5,486,054 | 1/1996 | Nagata et al. | 384/610 |

FOREIGN PATENT DOCUMENTS

| | | | |
|---|---|---|---|
| 0 032 231 | 7/1981 | European Pat. Off. | 310/90 |
| 0 599 563 | 6/1994 | European Pat. Off. | 310/90 |
| 0 701 069 | 3/1996 | European Pat. Off. | 310/90 |
| 2-46572 | 2/1990 | Japan | 310/40 MM |
| 4-131515 | 5/1992 | Japan | 310/40 MM |
| 6-14518 | 1/1994 | Japan | 310/40 MM |
| 2 151 413 | 7/1985 | United Kingdom | 310/90 |

*Primary Examiner*—Steven L. Stephan
*Assistant Examiner*—Karl I. Eizo Tamai
*Attorney, Agent, or Firm*—Staas & Halsey

[57] ABSTRACT

A bearing installation for a Floppy Disk Driver motor which is simple in structure and high in accuracy of a rotating action of a rotary shaft, thus hardly impairing the read and write characteristics of a Floppy Disk Driver device. A bearing installation for a Floppy Disk Driver motor includes a protective cap mounted to one side of the motor; a first pivot bearing arranged for free and axial movements on a rotary shaft of the motor relative to the protective cap; a thrust spring urging axially the first pivot bearing on the rotary shaft of the motor; the rotary shaft fixedly mounted on a rotor of the motor, and supported pivotally at one end by the first pivot bearing and at the other end by a second pivot bearing fixedly mounted on a platform on which the motor is installed; a lead screw joined to an outwardly extending portion of the rotary shaft from the motor; and a positioning bushing arranged through which the rotary shaft fixed to the motor extends without direct contact with and closely fitted into a positioning hole provided in a plate to which the motor is secured.

17 Claims, 4 Drawing Sheets

BEARING INSTALLATION IN A FLOPPY DISK DRIVER MOTOR

BACKGROUND OF THE INVENTION

1. Field of the Invention

The present invention relates to a bearing installation for a floppy disk drive (hereinafter referred to as Floppy Disk Driver).

2. Description of the Prior Art

Floppy Disk Driver devices are easy to exchange and operate floppy disks and have been utilized widely as external memory devices for computer systems. The downsizing of personal computers encourages smaller dimensions of Floppy Disk Driver devices and it is extremely required to minimize the size of Floppy Disk Driver motors and magnetic head drive motors.

It is essential for such magnetic head drive motors to maintain a certain degree of accuracy in locating a magnetic head even if their overall dimensions are minimized. FIG. 7 is a cross sectional view showing a primary part of a conventional motor for satisfying the prescribed requirement. As shown in FIG. 7, there is provided a Floppy Disk Driver side plate 51 to which a PM pulse motor 52 is fixedly mounted for driving an unshown magnetic head carriage. More specifically, a mounting plate 53 of the pulse motor 52 is fastened by screws 54 to the Floppy Disk Driver side plate 51. A rotor 56 of the pulse motor 52 carrying permanent magnets is rotatably disposed inwardly of a stator 55 in the pulse motor 52. The construction of common PM pulse motors is known and will be explained in no more detail, excluding the following structure of a bearing installation.

A rotary shaft 57 is fixed to the rotor 56 as shown in FIG. 7, and a lead screw 58 is threaded on the outer periphery of the rotary shaft which lies on the extension of the rotary shaft and the outside of the pulse motor 52 in order to move a magnetic head carriage. The stator 55 of the PM pulse motor 52 is covered at one side with a protective cap 59 composed of metal plate. A rotary shaft leaf spring 60 is sandwiched between the side of the stator 55 and the protective cap 59 for urging the rotary shaft 57 in its axial direction. More particularly, the rotary shaft 57 is pivotably supported at one end by a ball 61 mounted on the distal end of the leaf spring 60. Also, the rotary shaft 57 is supported for stable rotation at its intermediate region by a sintered metal bearing 62 fixedly mounted to the mounting plate 53 of the stator 55. The other end of the rotary shaft 57 is pivotably supported by another ball 61 seated on a pivot bearing 63 fixedly mounted to a Floppy Disk Driver bottom plate (not shown). The balls 61 are coated thoroughly with layers of wear-protective grease 64.

In the bearing installation of the conventional Floppy Disk Driver motor, the rotary shaft 57 is largely supported by a combination of the sintered metal bearing 62 and the pivot bearing 63 and the accuracy in mounting the sintered metal bearing 62 to the PM pulse motor 52 mounting plate 53 and the pivot bearing 63 to the Floppy Disk Driver bottom plate should be critical. If the mounting accuracy is low, the lead screw 58 will be declined in the accuracy of rotation hence impairing read and write characteristics of the Floppy Disk Driver device.

Also, the rotary shaft 57 is urged by a thrust force applied through the ball 61 from the leaf spring 60 and its lead screw 58 may be decreased in the rotational accuracy when the ball 61 running directly on the leaf spring 60 is worn due to a change of the contact angle of the leaf spring 60 to the ball 61 and a shortage of the wear-protective grease 64 during a long run operation. This will also impair the read and write characteristics of the Floppy Disk Driver device.

It is an object of the present invention to eliminate the foregoing problems and more exactly, provide a bearing installation in a Floppy Disk Driver motor which is simple in its structure and high in its accuracy of rotating action of a rotary shaft thus hardly impairing the read and write characteristics of a Floppy Disk Driver device.

SUMMARY OF THE INVENTION

For achievement of the foregoing object of the present invention, a bearing installation in a Floppy Disk Driver motor is provided comprising: a protective cap mounted to one side of the motor; a first pivot bearing arranged for movements axially of a rotary shaft of the motor relative to the protective cap; a thrust spring urging the first pivot bearing axially of the rotary shaft of the motor; the rotary shaft fixedly mounted on a rotor of the motor, and supported pivotably at one end by the first pivot bearing and at the other end by a second pivot bearing fixedly mounted to a platform on which the motor is installed; a lead screw joined to an outwardly extending portion of the rotary shaft from the motor; and a positioning bushing arranged through which the rotary shaft extends in no direct contact with and closely fitted into a positioning hole provided in a plate to which the motor is secured.

The rotary shaft of the motor extends across the positioning bushing in no direct contact with it and is prevented from any friction loss impairing its rotational accuracy. This allows the operational accuracy of the lead screw to be increased considerably, thus eliminating the existing drawbacks in Floppy Disk Driver characteristics.

The axial load to the rotary shaft is relieved by the pivot bearing installed in the motor and will cause no wear resulting from such interaction between the thrust spring and the ball as in the prior art.

The relieving action will be implemented by a combination of the base of the pivot bearing and the protective cap which are made by mold forming of an inexpensive synthetic resin material.

Also, the rotary shaft is supported at one end by the pivot bearing which may be furnished with or without one or more of balls for optimum bearing actions. If no ball is used, the pivot bearing can be constructed with more simplicity.

DESCRIPTION OF THE PREFERRED EMBODIMENT

Preferred embodiments of the present invention will be described referring to the accompanying drawings.

Figure 1:
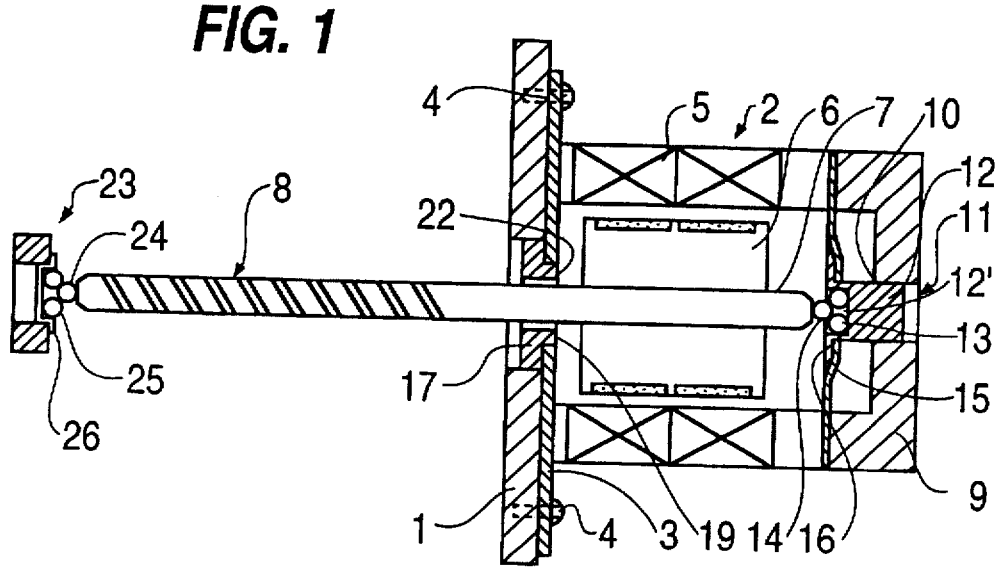
FIG. 1 is cross sectional view showing one embodiment of the present invention.

FIG. 1 is a cross sectional view of a bearing installation in a Floppy Disk Driver motor according to the present invention. As shown in FIG. 1, there is provided a Floppy Disk Driver side plate 1 to which a PM pulse motor 2 is fixedly mounted for driving an unshown magnetic head carriage. More specifically, a mounting plate 3 of the pulse motor 2 is fastened by screws 4 to the Floppy Disk Driver side plate 1. A rotor 6 carrying permanent magnets is rotatably disposed inwardly of a stator 5 in the pulse motor 2. While the construction of common PM pulse motors is well known and not depicted herein in more detail, the bearing installation of the present invention will be explained as follows.

The rotor 6 is fixedly mounted on a rotary shaft 7 of which extension extends outwardly of the pulse motor 2 and has a lead screw 8 to move a magnetic head threaded in an outer periphery thereof. The stator 5 of the PM pulse motor 2 is covered at one side with a protective cap 9 arranged by mold forming of a synthetic resin material. The protective cap 9 has a through aperture 10 provided in the center thereof. The base 12 of a pivot bearing 11 is fitted into the through aperture 10 for movement in the axial directions of the rotary shaft 7. A thrust spring 15 of a leaf type is mounted between one side of the stator 5 and the protective cap 9 for urging the pivot bearing 11 axially of the rotary shaft 7. The distal end of the thrust spring 15 is directly engaged with a flange region 16 of the base 12 of the pivot bearing 11.

Figure 2:
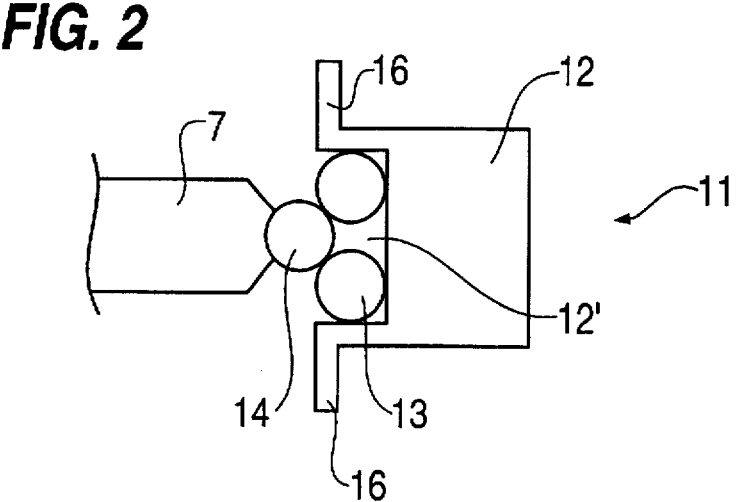
FIG. 2 is an enlarged view of a pivot bearing of the embodiment shown in FIG. 1.

FIG. 2 is an enlarged view of the pivot bearing 11 illustrated in FIG. 1. As shown, the base 12 of the pivot bearing 11 has a recess 12' therein where metallic balls 13 are accommodated. Also, a metallic ball 14 is joined to a taper end of the rotary shaft 7. The taper end of the rotary shaft 7 is pivotably supported by the base 12 of the pivot bearing 11 as its surface of joined ball 14 comes in direct contact with the surface of balls 13 in the recess 12'.

Figure 3:
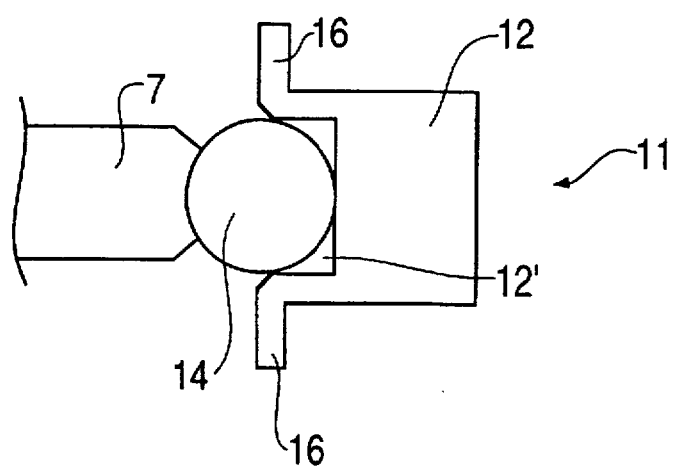
FIG. 3 is an enlarged cross sectional view of a pivot bearing showing another embodiment of the present invention.
Figure 4:
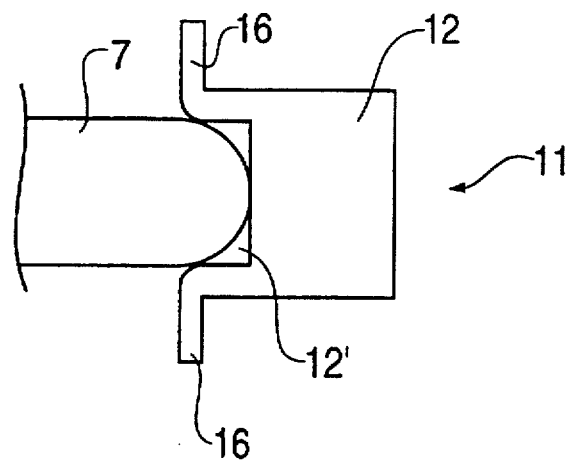
FIG. 4 is an enlarged cross sectional view of a pivot bearing showing a further embodiment of the present invention.

The pivot bearing installation shown in FIG. 2 may be replaced with another bearing installation. FIGS. 3 and 4 are enlarged views of different pivot bearing installations. As shown in FIG. 3, the recess 12' provided in a base 12 of a pivot bearing 11 does not accommodate any ball but directly accepts a large ball 14 joined to the taper end of a rotary shaft 7 for pivotal movement. The recess 12' may be filled with wear-protective grease.

In the pivot bearing installation shown in FIG. 4, a rotary shaft 7 has no ball joined thereto but its end is shaped to have a gently curved surface instead. As its rounded end is accepted in the recess 12', the rotary shaft 7 is pivotably supported by a base 12 of the pivot bearing. Similarly, the recess 12' may be filled with an amount of wear-protective grease. This pivot bearing installation is more simple as is is furnished with no balls.

Figure 5:
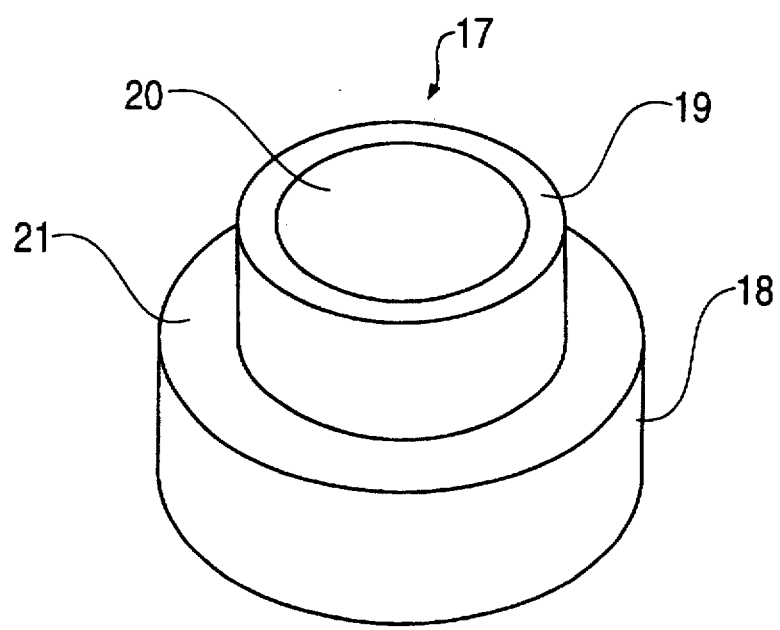
FIG. 5 is an enlarged view of a positioning bushing showing a still further embodiment of the present invention.

Returning back to FIG. 1, there is provided a positioning bushing 17 of a metallic material. FIG. 5 is an enlarged view of the positioning bushing 17. The positioning bushing 17 includes a portion of large diameter 18 and a portion of small diameter 19 which is connected to the former, and also a through opening 20 provided in the center thereof. The inner diameter of the through opening 20 is greater than the outer diameter of rotary shaft 7. The portion of small diameter 19 of the positioning bushing 17 is fitted into a positioning hole 22 provided in the mounting plate 3 of the PM pulse motor 2 so that its shoulder comes directly on the outer side of the mounting plate 3. The portion of small diameter 19 is then caulked to fasten the positioning bushing 17 to the mounting plate 3 at an accurate position. There is also a pivot bearing 23 fixedly mounted to a bottom plate (not shown) of the Floppy Disk Driver device for supporting through a ball 24 the other end of the rotary shaft 7. The pivot bearing 23 includes balls 25 and a ball tray 26.

The operation of the embodiment will now be described. Referring to FIG. 1, the rotary shaft 7 with the lead screw 8 is supported at both ends with the two pivot bearings 11 and 23, as compared with the prior art in which the rotary shaft 7 is supported at a central region by a bushing. In particular, the positioning bushing 17 mounted at its accurate position on the PM pulse motor 2 is only used for determining the correct location of the PM pulse motor 2 on the Floppy Disk Driver side plate 1 by fitting the portion of large diameter 18 of the positioning bushing 17 into the positioning hole 22 in the-Floppy Disk Driver side plate 1. This allows the rotary shaft 7 to be slightly spaced from the positioning bushing 17. Accordingly, the rotary shaft 7 will not create a friction loss in case that the pivot bearing 23 is barely dislocated from its correct position on the Floppy Disk Driver bottom plate. Therefore the lead screw 8 of the rotary shaft 7 is increased in operational accuracy, the prescribed drawbacks of the Floppy Disk Driver device can be eliminated.

The thrust exerted on the rotary shaft 7 is relieved by the pivot bearing 11 installed in the PM pulse motor 2 and such a wear of the ball and thrust spring as in the prior art can never be caused. This operation is implemented by inexpensive synthetic resin molded constructions of the protective cap 9 and pivot bearing base 12 in the PM pulse motor 2.

Figure 6:
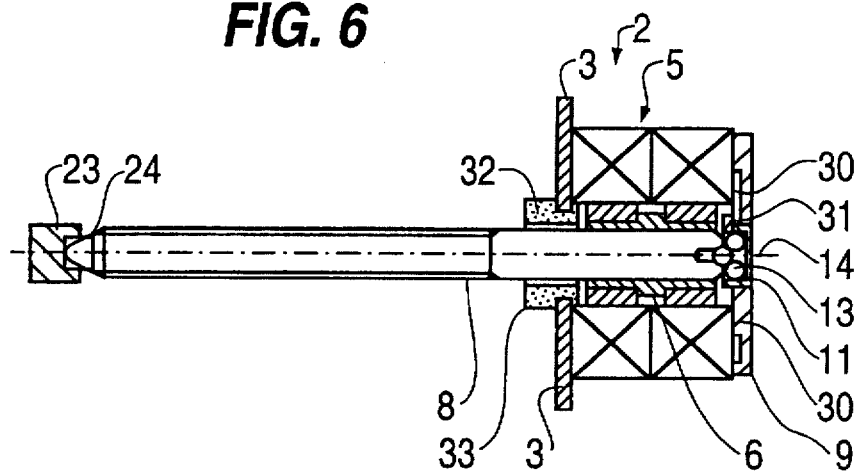
FIG. 6 is a cross sectional view showing another embodiment of the present invention.
Figure 7:
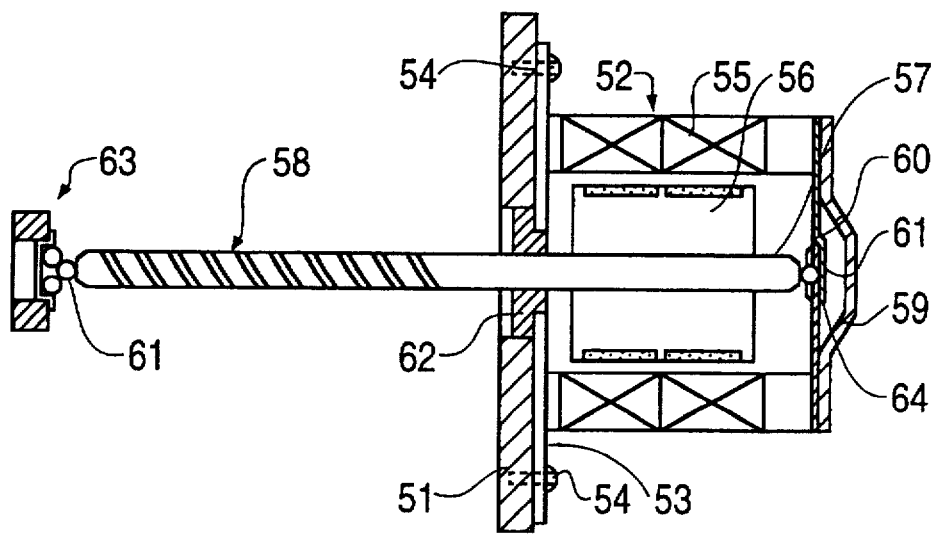
FIG. 7 is a cross sectional view of a conventional floppy disk drive PM type pulse motor, in which primary components are designated on the drawings as follows.

FIG. 6 is a cross sectional view showing a further embodiment of the present invention, in which identical components are designated by identical numerals as of the previous embodiment and will be explained in no more detail. As shown, a protective cap 9 fixedly mounted to the bottom of a stator 5 has a center aperture therein where a pivot bearing 11 is movably installed. A thrust spring 30 is mounted between the stator 5 and the protective cap 9 for urging a flange 31 of the pivot bearing 11. More particularly, the thrust spring 30 presses against two balls 13 and 14 of the pivot bearing 11, thus urging a lead screw 8 axially. This allows the lead screw 8 to be pivotably supported between the pivot bearing 11 and an opposite pivot bearing 23. A mounting plate 3 mounted to a front side of the stator 5 has a through hole 32 therein across which the lead screw 8 extends. A positioning bushing 33 made of a synthetic resin material is installed in the through hole 32 so that it is slightly spaced from the lead screw 8 extending through the hole 32.

As set forth above, the bearing installation of a Floppy Disk Driver motor according to the present invention allows the rotary shaft to be supported with no direct contact with the positioning bushing. Therefore, the lead screw on the rotary shaft is increased in the operational accuracy and drawbacks in the characteristics of the Floppy Disk Driver device can be eliminated.

While the motor is running, the axial load to the rotary shaft is relieved by the pivotal bearing in the motor thus eliminating such wearing of the ball and the thrust spring due to frictional movements as shown in the prior art. This operation is effectively implemented by a combination of the pivot bearing base and the protective cap of inexpensive synthetic resin molded forms.

Also, the rotary shaft is supported at one end by the pivot bearing which may be furnished with or without one or more balls for optimum bearing operations. If no ball is used, the pivot bearing can be constructed with more simplicity.

What is claimed is:

1. A bearing installation in a floppy disk drive motor comprising:

a protective cap mounted to one side of the motor;

a first pivot bearing having a base provided with a recess where one end of a rotary shaft is pivotally accepted, said first pivot bearing being arranged for free and axial movements on the rotary shaft of the motor relative to the protective cap;

a thrust spring urging the first pivot bearing axially of the rotary shaft of the motor;

the rotary shaft fixedly mounted on a rotor of the motor, and supported pivotally at the one end by the first pivot bearing and at the other end by a second pivot bearing fixedly mounted to a platform on which the motor is installed;

a lead screw to move a magnetic head threaded to an outwardly extending portion of the rotary shaft from the motor;

a positioning bushing located between the two pivot bearings, arranged through which the rotary shaft extends without direct contact with the positioning bushing and closely fitted into a positioning hole provided in a plate to which the motor is secured; and a flange portion disposed around said base, said flange portion being directly supported by the thrust spring.

2. A bearing installation in a Floppy Disk Driver motor according to claim 1, wherein balls are accommodated in the recess.

3. A bearing installation in a Floppy Disk Driver motor according to claim 1, wherein the rotary shaft has a ball joined to the one end thereof.

4. A bearing installation in a Floppy Disk Driver motor according to claim 1, wherein the rotary shaft has a ball joined to the one end thereof.

5. A bearing installation in a Floppy Disk Driver motor according to claim 2, wherein the rotary shaft has a ball joined to the one end thereof.

6. A bearing installation in a Floppy Disk Driver motor according to claim 1, wherein the one end of the rotary shaft is shaped to have a curved surface.

7. A bearing installation in a Floppy Disk Driver motor according to claim 1, wherein the one end of the rotary shaft is shaped to have a curved surface.

8. A bearing installation in a Floppy Disk Driver motor according to claim 2, wherein the balls are made of a metallic material.

9. A bearing installation in a Floppy Disk Driver motor according to claim 3, wherein the ball is made of a metallic material.

10. A bearing installation in a Floppy Disk Driver motor according to claim 4, wherein the ball is made of a metallic material.

11. A bearing installation in a Floppy Disk Driver motor according to claim 5, wherein the balls are made of a metallic material.

12. A bearing installation in a Floppy Disk Driver motor according to claim 1, wherein the positioning bushing comprises a portion of large diameter and a portion of small diameter which is connected to the former and has a through hole provided in a center thereof to extend through both of the large and small portions, an inner diameter of the through hole being greater than an outer diameter of the rotary shaft.

13. A bearing installation in a Floppy Disk Driver motor according to claim 1, wherein the positioning bushing is made of a metallic material.

14. A bearing installation in a Floppy Disk Driver motor according to claim 1, wherein the protective cap is composed of a synthetic resin molded form.

15. A bearing installation in a Floppy Disk Driver motor according to claim 1, wherein the base of the first pivot bearing is composed of a synthetic resin molded form.

16. A bearing installation in a floppy disk drive motor comprising:

a protective cap mounted to one side of the motor;

a first pivot bearing having a base provided with a recess mounting at least one ball, where one end of a rotary shaft mounting a ball is pivotally accepted by the at least one ball in the recess, said first pivot bearing being arranged for free and axial movements on the rotary shaft of the motor relative to the protective cap;

a thrust spring urging the first pivot bearing axially of the rotary shaft of the motor;

the rotary shaft fixedly mounted on a rotor of the motor, and supported pivotally at the one end by the first pivot bearing and at the other end by a second pivot bearing fixedly mounted to a platform on which the motor is installed;

a lead screw to move a magnetic head threaded to an outwardly extending portion of the rotary shaft from the motor;

a positioning bushing located between the two pivot bearings, arranged through which the rotary shaft extends without direct contact with the positioning bushing and closely fitted into a positioning hole provided in a plate to which the motor is secured; and a flange portion disposed around said base, said flange portion being directly supported by the thrust spring.

17. A bearing installation in a Floppy Disk Driver motor according to claim 16, wherein the ball is made of a metallic material.

* * * * *